Figures 3, 4:
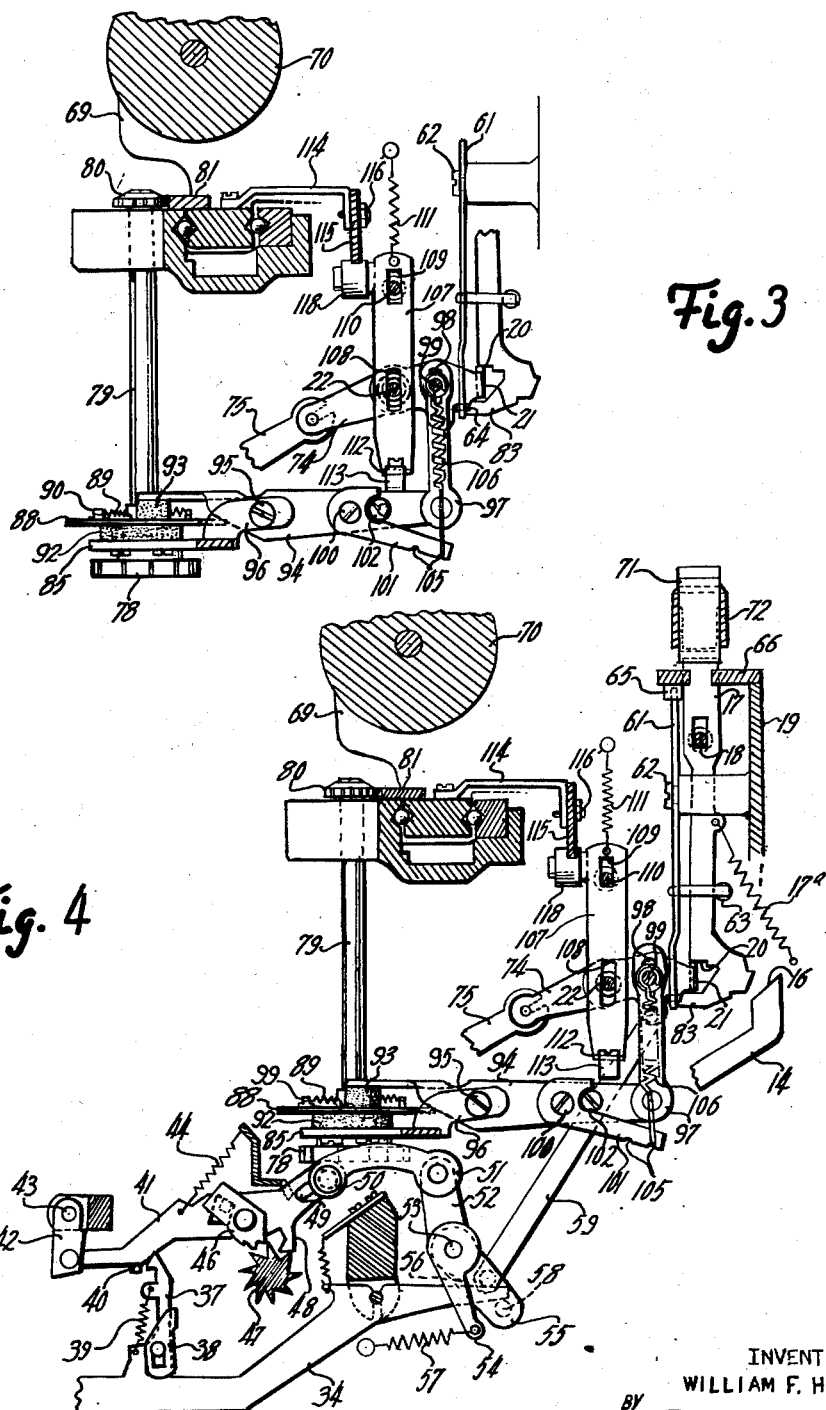

Sept. 18, 1951  W. F. HELMOND  2,568,497
CARRIAGE RETARDING DEVICE
Filed Oct. 14, 1948  3 Sheets-Sheet 1
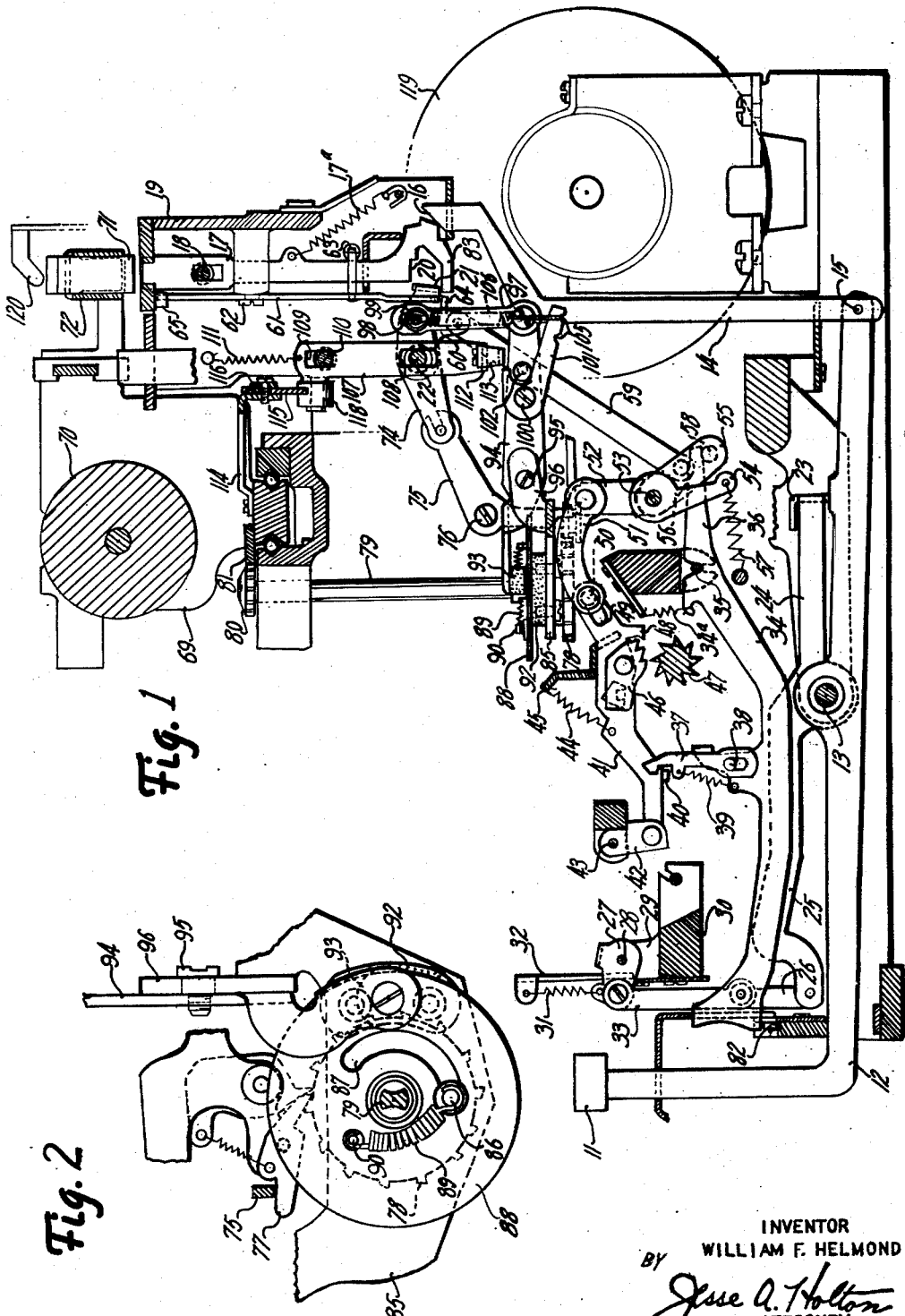
INVENTOR
WILLIAM F. HELMOND
BY Jesse A. Holton
ATTORNEY Sept. 18, 1951 W. F. HELMOND 2,568,497
CARRIAGE RETARDING DEVICE
Filed Oct. 14, 1948 3 Sheets-Sheet 2

INVENTOR
WILLIAM F. HELMOND
BY
Jesse A. Holton
ATTORNEY

Sept. 18, 1951   W. F. HELMOND   2,568,497
CARRIAGE RETARDING DEVICE
Filed Oct. 14, 1948   3 Sheets-Sheet 3
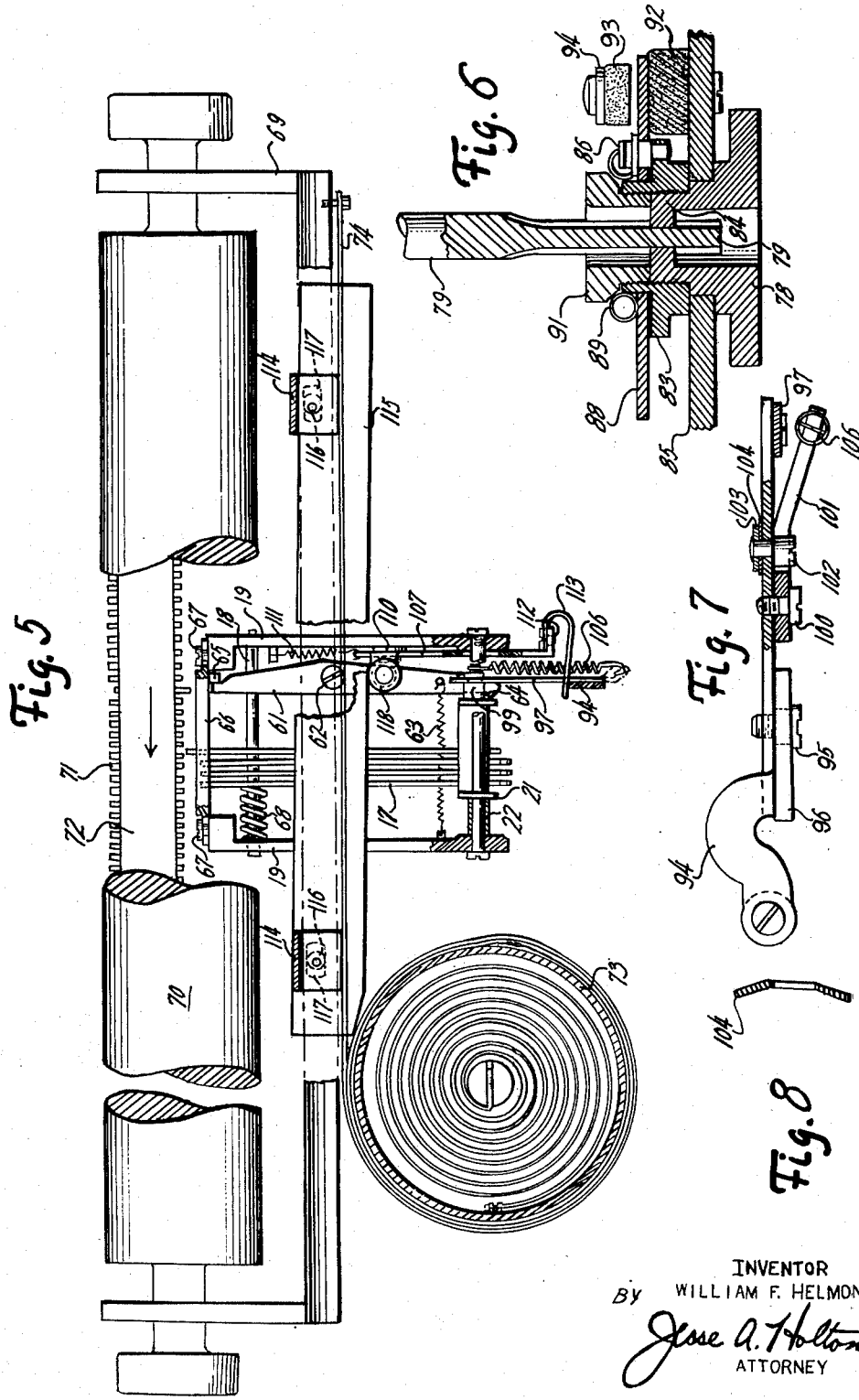
INVENTOR
WILLIAM F. HELMOND
BY
Jose A. Holton
ATTORNEY Patented Sept. 18, 1951

2,568,497

UNITED STATES PATENT OFFICE 2,568,497

CARRIAGE RETARDING DEVICE

William F. Helmond, Clinton, Conn., assignor to Underwood Corporation, New York, N. Y., a corporation of Delaware Application October 14, 1948, Serial No. 54,439

11 Claims. (Cl. 197—64)

This application relates to improvements in the tabulating mechanism of typewriting machines, or the like, and, in particular, to an improved braking mechanism to control the speed of travel of the carriage during a tabulating movement.

In typewriting machines the carriage is usually drawn in letter feed direction by the power of a spring motor. To prevent the carriage from attaining an excessive speed during tabulating runs of appreciable extent, it has been the practice to associate therewith motion impeding means in the form of a carriage brake which is rendered effective as an incident to each tabulating operation and for the duration thereof.

In typewriting machines having carriages of considerable length, there arises the difficulty that the pull of the carriage feed spring will vary considerably from the maximum when the carriage is in its returned position, to the minimum when the carriage approaches the line end. It follows therefore that if the carriage speed is to be governed so as to be substantially constant for tabulating runs in different zones of travel, the braking action must be varied in accordance with the position of the carriage during its travel.

In some prior devices this has been accomplished by coaction of a brake shoe and a carriage mounted face which has a slight angle to the direction of carriage travel, the relationship being such that the shoe has its maximum and minimum braking action on said face respectively at the start and at the end of the line. In such arrangements the braking pressure of the shoe exerts an undesirable thrust on the guideways for the carriage, and, moreover, the carriage mounted face plate is a costly item since the pressure exerted thereupon by the brake shoe requires that the face be solidly constructed. Also, different lengths and weights of carriages call for braking faces of different angles and different lengths.

It is a general object of the invention to provide an improved, efficient and reliably operative carriage braking device to control the speed of the carriage during tabulations.

It is also an object of this invention to devise a tabulation brake which is effective to retard a typewriter carriage but which exerts no thrust on the carriage guideways.

Another object is to provide a lost motion connection between a brake and a typewriter carriage such that the brake is applied during the entire tabulation movement of the carriage but is effective to retard the carriage only after an initial free tabulating movement.

Still another object is to provide a carriage braking device which is applied by the mechanism which projects a tabulator stop reed and remains so applied during the entire time of projection of such reed.

It is a further object to provide in conjunction with mechanism for power operating one of a group of tabulator stops, a mechanism to concomitantly apply a carriage braking device, and to make provision for maintaining the operated tabulating stop and the carriage braking mechanism in operated position pending the termination of the tabulating run.

Another object is to devise a carriage braking mechanism which is power engaged under control of a tabulator key but which is maintained engaged independently of such key and until an instituted tabulating run is completed.

It is a further object to provide a reliably operating and economically manufacturable carriage braking device which embodies a simple provision for delaying the effectiveness of braking action for an initial carriage run sufficient to permit the carriage to quickly attain a desirable, but not excessive, tabulating speed.

A further object is to provide an adjustable device capable of varying the carriage braking action during tabulating runs which device may be regulated under control of the carriage to compensate for variation in the propelling force on the carriage, and capable of effecting such results without objectionable thrust against the carriage guideways.

Still other objects and features of the invention will be in part obvious and in part pointed out particularly as the following description of the preferred embodiment of the invention proceeds.

Referring now to the drawings:

Figure 1 is a sectional side view of a typewriter showing a carriage tabulating mechanism, and a carriage braking device for controlling the tabulating speed of the carriage in their normal, idle condition, Figure 2 is a detail view showing a carriage escapement mechanism and a tabulating brake associated with the escapement wheel of such mechanism, Figure 3 is a side view of a portion of the structure shown in Figure 1 and illustrates the tabulating mechanism and the carriage braking device in operated position, the carriage exercising influence upon the braking device to cause it to function with diminished friction, Figure 4 is a sectional view similar to Figure 3 except that the carriage is in a position wherein the braking device functions with maximum effect, Figure 5 is a partial front elevation of the tabulating mechanism and the carriage braking mechanism in the operated condition of Figure 3, Figure 6 is a sectional view of the structure shown in Figure 2, Figure 7 is a detail view of the brake arm, including an adjustment feature, and Figure 8 is a detail showing an element of the adjustment feature of Figure 7.

The improvement is disclosed in the accompanying drawings as embodied in a conventional Underwood Electric typewriter. Only so much of the typewriter is included in the drawings as is needed to show the manner in which the improvement is incorporated therein.

*Tabulating mechanism*

Referring more particularly to Figure 1 of the drawings, the reference numeral 11 designates a tabulator key of which there are a number, each one of a different decimal order. Each key 11 heads a lever 12, and when depressed rocks such lever about a pivot rod 13 to elevate the one of the push rods 14 associated therewith, the push rods 14 each being pivotally connected with the rear end of a lever 12 as at 15.

The upper end of each push rod 14 is formed to provide a cam face 16 which face 16 is engageable with an associated tabulator stop blade 17 to rock it forwardly about its upper end. The several stop blades 17 are arranged slightly spaced from each other, in a row, and are guided for vertical and a slight pivotal movement in a top plate 66 of a tabulator blade housing 19. A rod 18 extending through perforations in the blades 17 and supported in the housing 19 provides a stop means by which the lower position of the blades 17 is determined, springs 17a connected between the blades 17 and housing 19 being provided to tension the blades 17 downwardly and counterblockwise about the top plate 66. Each of the blades 17 has a horizontal face 20 normally lying to the rear and slightly above a bail 21, said face 20 being in the forwardly rocked position of blade 17, over and in position to be engaged by bail 21. Bail 21 is freely pivoted on a shaft 22 supported between the side plates of the housing 19 and may be rocked counterclockwise by a power drive to elevate a blade 17 which has been rocked by depression of a key 11.

A universal bar 23 embodying side arms 24 by means of which it is pivoted on the same shaft 13 which supports the tabulator key levers 12, overlies the rear arms of all the levers 12. Depression of any tabulator key 11 thus raises the universal bar 23, rocking the side arms 24 counterclockwise. One of the arms 24 is part of lever which includes a forwardly extending arm 25 which is connected by a link 26 to a cross bail 27. Said cross bail 27 is mounted on a pivot rod 28 which is fixed in a bracket 29 secured to a part of the machine frame 30. A spring 31 connected between a bracket 32 on frame 30 and an arm of bail 27, urges bails 27 and 23 to their normal positions as shown in Figure 1. Bail 27 is connected by a pendant link 33 to the forward end of a lever 34. Lever 34 is pivoted on a pivot rod 35, and has a rearwardly extending arm 36.

Lever 34 is analogous to the type key levers of the Underwood Electric typewriter and like the type key levers carries a hook 37, slidably mounted on a pin 38 thereon. Hook 37 is normally urged forwardly and downwardly by a spring 39 to a position wherein its upper hooked end overlies a lug 40 on an actuator bar 41. Bar 41 is pivoted at its forward end to a lever 42 rotatable on a fixed rod 43. The rear end of bar 41 is pulled by a spring 44 connected between the lever 41 and an angle bar 45 upwardly and to the rear into engagement with angle bar 45. A snatch pawl 46 is pivoted on bar 41 near the center thereof and when bar 41 is rocked about its pivot on lever 43 by depression of a tabulator key 11, will engage snatch roll 47. Snatch roll 47 is continuously driven counterclockwise by a motor 119 through any suitable gearing and thus when snatch pawl 42 is depressed into engagement with the snatch roll 47, bar 41 will be driven forwardly rocking lever 42 about its pivot rod 43. Actuator bar 41 is provided with a disengaging lug 48 which projects downwardly just to the rear of snatch pawl 29. Near the end of a power stroke of bar 41 a tooth of snatch roll 47 will engage the lower surface of lug 48 and move it upwardly to thereby disengage snatch pawl 46 from snatch roll 47 as shown in Figure 4.

The rear end of bar 41 is provided with a slot 49 in which is engaged a pin 50 of link 51. Link 51 is connected to an upstanding arm 52 of a tabulator shaft 53 and will rotate shaft 53 counterclockwise during a forward stroke of actuator bar 41. Tabulator shaft 53 has fixed thereto three other arms 54, 55 and 56, a spring 57, connected between a stationary part of frame 30 and arm 54, serving to maintain the shaft in its normal clockwise position shown in Figure 1. Arm 55 carries a pin 58 underlying the rear arm 36 of lever 34 and maintains lever 34, which is rocked upon depression of a tabulator key 11, in the rocked position so long as shaft 53 remains rocked. Arm 56 is connected by a link 59 to a lug 60 on bail 21 to raise bail 21 and thus project the forwardly set one of the tabulator blades 17.

Bail 21 and the projected blade 17 are retained in their upper position by a lock lever 61 shown more clearly in Figure 5, which is pivoted on a screw 62 in a projection of the tabulator frame 19 and is tensioned clockwise by a spring 63 for latching engagement with a lug 64 on bail 21 when the bail 21 is raised by rotation of shaft 53. Also, as shown in Figure 5, the upper end of lever 61 is, in its latching position, in engagement with a lug 65 fixed to the upper tabulator housing top plate 66. Plate 66 is slidably mounted on the side plates 19 by studs 67 fitted in elongated holes in the plate 66. A compression spring 68 is wound around the part of pivot rod 18 which is between the left hand side plate 19 and the left hand stop blade 17 to press this left hand stop blade 17 together with the top plate 66 in which all of the blades 17 are vertically slidable to the right, top plate 66 carrying with it the upper ends of the remaining stop blades 17. A paper carriage 69 of conventional design supports a platen 70 and also the usual tabulator stops 71 in a bar 72 fixed to the rear of the carriage. A spring drum 73 is connected by a flexible tape 74 to the right hand end of the carriage 69 and urges it to the left for letter space and tabulating movements. Engagement of a tabulator stop 71 with a blade 17 at the end of a carriage tabulation run will carry blade 17 and top plate 66 to the left in Figure 5 and release latch 61.

The carriage 69 is released for a tabulating run by the upward movement of bail 21 to project the stop blade 17 which has been set forward by operation of a tabulating key 11. Referring again to Figure 1, a forwardly extending arm 74 of bail 21 is connected by a pin and slot connection to an arm of a lever 75 rotatable on a fixed stud 76. The other arm of lever 75 extends downwardly and normally rests behind one arm of a dog 77, see Figure 2, forming a part of the escapement mechanism of the typewriter, the escapement mechanism being more fully shown in the Helmond Patent 2,074,333 of March 23, 1937. Dog 77 is normally in engagement with an escapement wheel 78 splined to a shaft 79, as also shown in Figure 6, and retains the carriage 69 against letter feed movement. Shaft 79 carries at its upper end a gear 80 meshing with a rack bar 81 fixed to the paper carriage 69. Rocking of bail 21 to lift a tabulator stop blade 17 to an operative position thus also releases the escapement dog 77 from the escapement wheel 78 to free the carriage 69 for tabulation.

In the operation of the structure thus far described, depression of a tabulator key 11 rocks the key lever 12 and raises the push rod 14, thereby setting the lower end of the associated tabulator blade 17 to a forward position with the shoulder 20 over bail 21. At the same time, the actuated lever 12 raises universal bar 23 and thereby, through link 26, bail 27 and link 33, depresses the front end of the tabulator action bar 34. The initial movement of bar 34 engages hook 37 with the top surface of lug 40 of the actuator 41, the further movement of bar 34 thereafter rocking actuator 41 about its pivot on lever 42 to engage the snatch pawl 46 with the constantly rotating snatch roll 47. Bar 41 is then driven forwardly, to disconnect its lug 40 from hook 37 and, by means of link 51, rocks shaft 53 counterclockwise. Actuator bar 41 is disengaged from the snatch roll 47 at the end of the forward stroke of the bar by a tooth of the snatch roll 47 striking the lower surface of lug 48 and raising the bar 41 to move snatch pawl 46 out of the engaging position after which actuator bar 41 is returned by spring 44 to the normal position. Counterclockwise rotation of shaft 53 by actuator bar 41 raises bail 21 to its operated position, Figure 4, in which position the lower hooked end of latch lever 61 snaps under lug 64 of bail 21 and retains the bail in this upper position, thus preventing a return rotation of shaft 53 at this time. The pin and slot connection between actuator bar 41 and link 51 permits the bar 41 to be returned to normal position independently of the position of shaft 53. Pin 58 of arm 55 engages the rear arm 36 of lever 34 which was rocked by depression of the tabulating key 11 to retain this lever depressed so long as shaft 53 is rocked. The forward end of lever 34 enters into a roller lock 82 of conventional design and prevents depression of any of the other keys of the keyboard during the ensuing tabluation of the carriage.

When bail 21 is raised as above described, it engages the under surface 20 of the stop blade 17 which has been rocked to a forward position by the depression of a tabulator key 11 and elevates the blade 17 to an upper position where its end is in the path of a set stop 71 on carriage 69. Bail 21 and stop blade 17 are locked in this operated position by latch lever 61 engaging under lug 64 on the bail 21. The forward arm 74 of bail 21 rocks lever 75 which in turn rotates dog 77, Figure 2, counterclockwise to release the escapement wheel 78.

Carriage 69 is now free to move to the left under the influence of its spring drum 73 and it does so until a set tabulator stop 71 engages the projected stop blade 17. A stop setting finger 120 of conventional construction is provided to set any desired tabulator stops 71 and thus determine the location of a tabulated carriage position. When a stop 71 of the carriage 69 strikes the projected stop blade 17, the momentum of the carriage 69 and the tension of the carriage spring drum 73 moves the top of the blade 17 and top plate 66 to their left hand positions as determined by the studs 67 abutting the right hand ends of the slots in plate 66, thereby compressing spring 68. During this leftward movement of plate 66, the lug 65 thereon engages the upper end of latch lever 61 and rotates the lever 61 counterclockwise to release lug 64 of bail 21. Spring 57 acting on arm 54 of shaft 53 then returns shaft 53, bail 21, and lever 75 to their normal positions. The return of lever 75 permits dog 77 to engage escapement wheel 78 and thereby retain the carriage 69 in the tabulated position. Bail 21 in returning to normal position restores the set stop blade 17 to its lower position wherein it is free of the carriage stop 71 by the engagement of bail 21 with the lower projection 83 of blade 17, whereupon spring 68 moves the blades 17 and top guide plate 66 to their normal right hand position. Restoration of shaft 53 moves pin 58 from its engagement with arm 36 of lever 34 and releases lever 34 to unblock roller lock 82. Lever 34 when freed is rotated clockwise by its restoring spring 34a to reposition its hook 37 over lug 40 of bar 41.

*Tabulator brake*

A tabulator brake is provided to limit the carriage velocity during a long tabulating movement and so prevent an excessive strain on the relatively light tabulator parts when they stop the carriage. Referring to Figures 2 and 6, a nut 83 is screwed to an upwardly extending threaded portion 84 of the escapement wheel 78 to retain the escapement wheel 78 in position in a hole in the stationary frame plate 85. A stud 86 is fixed in the upper face of nut 83 and projects through an arcuate slot 87 of a disc 88 freely floating on the upper face of nut 83. A spring 89 connected between stud 86 and a stud 90 fixed in disc 88 serves to normally maintain the disc 88 with one end of its slot 87 abutting stud 86. A perforated shouldered member 91 is screwed into the upper end of nut 83 to restrain spring 89 and disc 88 from excessive upward movement. A main brake shoe 92 made of a suitable friction material is fixed to frame 85 below disc 88. Directly above brake shoe 92 and normally spaced above disc 88 is an auxiliary brake shoe 93 which is fixed to the forward end of a lever 94. Lever 94 is pivoted at 95 to an ear 96 bent off the frame member 85, as further shown in Figures 1 and 7. The rear end of lever 94 is pivotally connected to a link 97, see Figures 1, 3 and 4, the upper end of which has a vertical slot 98 embracing a stud 99 in the right hand arm of bail 21. Also fixed, by a screw 100, to the rear end of lever 94 is a brake adjusting arm 101. The position of arm 101 on lever 94 is adjustable by a rotatable eccentric stud 102 riveted, as shown in Figure 7, to the lever 94 and two washers 103 and 104. Washer 104 is bent as shown in Figure 8 and is made of spring steel to frictionally hold stud 102 in its set position. Adjusting arm 101 has a plurality of notches 105 in its rear end. A spring 106 is connected between one of these notches 105 and the stud 99 of bail 21 and normally maintains the arm 94 and link 97 in a position where the lower end of slot 98 of link 97 abuts pin 99 of bail 21.

The upper brake shoe 93 is normally held free of disc 88 when bail 21 is in its lower position due to the engagement of stud 99 with the bottom end of slot 98. When bail 21 is raised at the beginning of a tabulation as described above, spring 106, connected between bail 21 and lever 94, causes lever 94 to follow bail 21 until shoe 93 engages the top of disc 88. Continued movement of bail 21 moves its stud 99 from the bottom of slot 98 in link 97 and further tensions spring 106, thereby applying pressure to brake shoe 93. The maximum tension of spring 106 and the pressure of brake shoe 93 on disc 88 may be adjusted as desired by rotation of positioning arm 101 about screw 100 by means of rotation of eccentric stud 102 thereby varying the initial tension of spring 106.

The movement of carriage 69 is not immediately retarded by this action of brake shoes 92 and 93 on disc 88 since there is a lost motion connection between disc 88 and the carriage escapement shaft 79. When the escapement dog 77 is rocked by lever 75 to release escapement wheel 78, the carriage 69 travels freely except for the relatively immaterial resistance of spring 89 until stud 86 reaches the other end of slot 87 in disc 88. When stud 86 reaches the other end of slot 87, the disc 88 is, through stud 86, carried along with the escapement wheel 78 and, as disc 88 is pressed between brake shoes 92 and 93, further movement of the carriage is retarded. At the end of a tabulating movement, brake shoe 93 is released due to the lowering of stud 99 on bail 21 which stud 99 through link 97 rocks lever 94 clockwise. Disc 88 is then free to be rotated by spring 89, stretched by the initial rotation of the escapement wheel 78, until it is in the initial position relative to stud 86.

*Carriage control of brake pressure*

A delayed action tabulating brake as described above is suitable for short tabulating movements in any carriage position and for long tabulating movements in the right hand portion of carriage travel but, since it has a constant resistance, the brake will unduly retard the carriage when tabulating in the left hand portion of carriage travel where the force exerted by spring drum 73 on carriage 69 is materially decreased. A carriage controlled relief member is therefore provided to modify the pressure of brake shoe 93 on disc 88 when the carriage 69 is in the left zone of its travel. This relief member consists of a slide 107, Figures 1, 3, 4 and 5, provided with vertical slots 108 and 109 and slidable on rod 22 and a stud 110 fixed in the right side tabulator housing 19. Spring 111 holds slide 107 at the top of its movement as determined by the engagement of the lower edge of slot 108 with stud 110. The lower end of slide 107, see Figure 5, is bent over in an ear 112 to which is secured a leaf spring 113 having a return bend and overlying the rear arm of lever 94. Mounted on the right side of the carriage 69 by brackets 114, see also Figures 1, 3 and 4, is a bar 115 having its lower edge inclined downwardly to the right and adjustable on brackets 114 by rotatable eccentric washers 116 screwed to brackets 114 and engaged in slots 117 in the bar 115. A roll 118 is mounted on slide 107 in a position for engagement with the lower edge of bar 115.

The positions of the parts of the tabulator brake with the carriage 69 in its right hand zone of travel are as shown in Figure 4. In this figure, bar 115 is not in contact with roller 118 and slide 107 is not depressed. Thus the full tension of spring 106 is applied to brake shoe 93 and the braking effect on disc 88 is at the maximum. The tension of spring 106 has been adjusted by rotation of eccentric stud 102 until the maximum braking effect thus obtained is sufficient to hold the paper carriage 69 to a safe velocity during tabulation movements. At about the mid-point of carriage travel, the tension of the carriage spring drum 73 decreases to such an extent that if this maximum braking force is applied to disc 88, the carriage will tabulate too slowly and may stop. If the carriage is to be moved in its left hand zone at a constant velocity during tabulating movements, the braking resistance on disc 88 must be reduced and should preferably be reduced variably to compensate at each carriage position for the decreased power of spring drum 73. A variable reduction of the pressure of brake shoe 93 is controlled by the inclined bar 115 on the carriage. At about the mid-point of carriage movement, slide 107 is depressed by bar 115 contacting roller 118 as shown in Figure 3. This moves the free end of leaf spring 113 down against the top edge of lever 94. The force exerted on lever 94 by the leaf spring 113 is in opposition to that exerted on lever 94 by spring 106 and reduces the pressure of brake shoe 93 on disc 88, resulting in a lessening of the drag on the carriage. Since bar 115 is inclined, the slide 107 and leaf spring 113 are depressed a variable extent dependent upon the position of the carriage 69, and the pressure of brake shoe 93 is correspondingly varied. The slope of bar 115 may be so set by rotation of eccentric washers 116 that the decreasing driving tension of spring drum 73 is just compensated by the decreasing resistance of the brake shoes 92 and 93 on disc 88. The velocity of the carriage during tabulation will thereby be controlled to be substantially constant during tabulating movements of any extent and irrespective of the initial position of the carriage.

The preceding detailed description of the preferred embodiment is not intended to limit the scope of my invention as it will be obvious that various changes and modifications may be made without departing from the invention as described in the following claims. In particular, the brake may be used without the variable feature or a manual tabulating mechanism may be substituted for the power operated tabulating structure disclosed.

What is claimed is:

1. In a typewriter having a carriage, spring driven propelling means for said carriage, an escapement means having a portion connected to said carriage, and a tabulating mechanism comprising a plurality of stop reeds, means to project one of said plurality of stop reeds into the path of travel of said carriage and means to release said carriage from the restraint of said escapement means, the combination of a brake to prevent the attainment of an excessive speed of travel of said carriage, said brake comprising a disc, a lost motion connection between said disc and said carriage connected portion of said escapement means, means urging said disc to a normal position with respect to said portion of said escapement means, a fixed brake shoe and an opposed movable brake shoe on opposite sides of said disc, a yieldable connection between said movable brake shoe and said tabulating mechanism whereby operation of said tabulating mechanism to free said carriage for a tabulating run concomitantly engages said disc between said brake shoes, a brake control member on said carriage, and means operated by said control member to variably relieve the movable brake shoe of the force exerted thereon through said yieldable connection.

2. In a typewriter having a carriage, spring driven propellling means for said carriage, an escapement means having a portion connected to said carriage, and a tabulating mechanism comprising a plurality of stop reeds, means to project one of said plurality of stop reeds into the path of travel of said carriage and means to release said carriage from the restraint of said escapement means, the combination of a brake to prevent the attainment of an excessive speed of travel of said carriage, said brake comprising a disc, a lost motion connection between said disc and said carriage connected portion of said escapement means, means urging said disc to a normal position with respect to said portion of said escapement means, a fixed brake shoe and an opposed movable brake shoe on opposite sides of said disc, a yieldable connection between said movable brake shoe and said tabulating mechanism whereby operation of said tabulating mechanism to free said carriage for a tabulating run concomitantly engages said disc between said brake shoes, a brake control member on said carriage, and a slide operated by said control member, said slide including a resilient section to engage said movable brake shoe and variably relieve the movable brake shoe of the force exerted thereon through said yieldable connection.

3. In a machine of the class described, a travelling carriage, means to urge the carriage in one direction, escapement means to normally restrain said carriage against the urge of said urging means, a plurality of tabulator keys, a plurality of tabulator stop reeds, one for each key, means controlled by each of said keys to project the stop reed associated with said key into the path of said carriage and to free said carriage from the restraint of said escapement means, a brake member connected to said carriage for movement therewith, retarding means cooperative with said brake member, a resilient connection between said retarding means and said stop reed projecting means to move said retarding means into engagement with said brake member upon projection of one of said stop reeds, an inclined member on said carriage, and means variably operated by said inclined member to vary the effectiveness of said retarding means on said brake member.

4. In a machine of the class described having a carriage, an escapement mechanism therefor, and tabulating mechanism to free said carriage from said escapement mechanism, the combination of a brake member driven from said carriage, a retarding means engageable with said brake member, means operated by said tabulating mechanism to engage said retarding means with said brake member with a predetermined pressure, and means operated by said carriage in a predetermined zone of carriage travel to variably reduce said predetermined pressure.

5. In a machine of the class described having a carriage, an escapement mechanism therefor, and tabulating mechanism to free said carriage from said escapement mechanism, the combination of a rotatable brake member, means including a lost motion connection to drive said brake member from said carriage, a brake shoe engageable with said brake member, resilient means connected to said tabulating mechanism and operated thereby to engage said brake shoe with said brake member with a predetermined pressure, an adjustable member on said carriage and another resilient means operated by said adjustable carriage member in a predetermined zone of carriage travel and engageable with said brake shoe to variably reduce said predetermined pressure.

6. In a typewriter having a carriage urged in one direction, an escapement mechanism connected to said carriage, and tabulating mechanism to define a point for termination of a carriage movement and to release said escapement mechanism to permit movement of said carriage in the said direction, the combination of normally idle braking means to limit the speed of movement of said carriage, means operated by said tabulating mechanism to apply said braking means, an inclined member on said carriage, and means variably positioned by said inclined member in accordance with the position of said carriage to progressively alter the retarding effect of said braking means as the carriage travels during tabulations.

7. In a typewriter having a carriage, means to urge said carriage in one direction, an escapement mechanism to restrain said carriage against the urging of said means, tabulating mechanism to define a point for termination of a carriage movement and to release said escapement mechanism to permit movement of said carriage, tabulator keys, means operated by said tabulator keys to momentarily operate said tabulating mechanism, means to latch said tabulating mechanism in an operated position, and means operated by said carriage upon arrival at said defined point for termination of carriage movement to release said latching means, the combination of a normally ineffective two-part brake means, a lost motion connection between said carriage and a part of said brake means, means connecting another part of said brake means and said tabulating mechanism and operable by said tabulating mechanism to render said brake means effective, a member on said carriage, and means controlled by said member and cooperating with said another part of said brake means to modify the carriage retarding effect of said brake means.

8. In a typewriter having a carriage, spring driven propelling means for said carriage, and an escapement means for said carriage, the combination of a plurality of tabulating keys, a bail, power means controlled by said keys to operate said bail, a plurality of stop reeds, a means operated by each of said keys to move one of said stop reeds to a position wherein said bail will upon operation project said stop reed into the path of said carriage, means operated by said bail to release said escapement means, means to latch said bail in operated position, latch release means operated by said projected stop reed when said carriage is arrested thereby, a brake member, a lost motion connection between said brake member and said carriage, a brake arm, a brake shoe on said arm, adjustable means including a spring connected to said bail and said brake arm to engage said brake shoe with said member and apply pressure thereto upon operation of said bail, a member on said carriage, and resilient means engageable by said member and engageable with said brake arm to alter the pressure of said brake shoe on said brake member.

9. In a typewriter having a carriage, spring driven propelling means for said carriage, and an escapement means for said carriage, the combination of a plurality of tabulating keys, a bail, power means controlled by said keys to move said bail to an operated position, a plurality of stop reeds one associated with each of said tabulating keys, means operated by each of said keys to move the assoicated one of said stop reeds to a position wherein said bail will upon operation project said stop reed into the path of a portion of said carriage, means operated by said bail to release said escapement means, means to latch said bail in said operated position, latch release means operated by said projected stop reed when said carriage is arrested thereby, a brake member, a lost motion connection between said brake member, and said carriage, a brake arm, a brake shoe on said arm, and adjustable means including a spring connected to said bail and said brake arm to engage said brake shoe with said member and apply pressure thereto upon operation of said bail.

10. In a typewriter having a carriage, driving means for said carriage, and an escapement mechanism connected to said carriage, settable tabulator stops on said carriage, a plurality of tabulator stop reeds on said frame, a bail operative to release said escapement mechanism and to project a selected one of said tabulator stop reeds into the path of any set tabulator stop, a plurality of tabulator keys to select said tabulator stop reeds, means common to said keys, power means controlled thereby to operate said bail, normally ineffective means to retard the motion of said carriage, resilient means connected to said bail to render said retarding means effective upon operation of said bail, and compensating means controlled by said carriage through movement thereof to modify the effect of said retarding means on said carriage.

11. In a typewriter having a carriage, driving means for said carriage and an escapement mechanism connected to said carriage, settable tabulator stops on said carriage, a plurality of tabulator stop reeds on said frame, each said tabulator stop reed projectable into the path of the set ones of said tabulator stops, a bail operative to release said escapement mechanism and to project a selected one of said tabulator stop reeds, a plurality of tabulator keys to select said tabulator stop reeds, means common to said keys, power means controlled thereby to operate said bail, a latch to retain said bail in operated position, latch release means operated by said carriage and including said settable tabulator stops and tabulator stop reeds, normally ineffective retarding means including a disc, a lost motion connection between said disc and said carriage and a friction member engageable with said disc to retard the motion of said carriage, resilient means controlled by said bail to engage said friction member with said disc, adjustable means to predetermine the pressure of said friction means upon said disc, an adjustable member on said carriage, and a slide operated by said adjustable member in certain zones of carriage travel to apply to said friction member a force opposing that transmitted through said resilient means to thereby alter the carriage retarding effect of said retarding means.

WILLIAM F. HELMOND.

REFERENCES CITED

The following references are of record in the file of this patent:

UNITED STATES PATENTS

| Number | Name | Date |
|---|---|---|
| 1,757,134 | Muller | May 6, 1930 |
| 1,954,472 | Dobson | Apr. 10, 1934 |
| 2,129,650 | Crumarine | Sept. 13, 1938 |
| 2,379,843 | Von Reppert | July 3, 1945 |